United States Patent
Xi et al.

(10) Patent No.: US 11,492,102 B2
(45) Date of Patent: Nov. 8, 2022

(54) AIRCRAFT WING WITH DISPLACEABLE WINGLET

(71) Applicant: BOMBARDIER INC., Dorval (CA)

(72) Inventors: Fengfeng Xi, Toronto (CA); Amin Moosavian, Mississauga (CA); Jose Vieira De Sa, Toronto (CA); Gabriel H. Campos Naranjo, Toronto (CA)

(73) Assignee: BOMBARDIER INC.

( * ) Notice: Subject to any disclaimer, the term of this patent is extended or adjusted under 35 U.S.C. 154(b) by 444 days.

(21) Appl. No.: 16/795,805

(22) Filed: Feb. 20, 2020

(65) Prior Publication Data

US 2020/0269971 A1 Aug. 27, 2020

Related U.S. Application Data

(60) Provisional application No. 62/809,795, filed on Feb. 25, 2019.

(51) Int. Cl.
*B64C 23/06* (2006.01)
*B64C 3/18* (2006.01)
*B64C 9/00* (2006.01)

(52) U.S. Cl.
CPC ............ *B64C 23/072* (2017.05); *B64C 3/185* (2013.01); *B64C 9/00* (2013.01); *B64C 2009/005* (2013.01)

(58) Field of Classification Search
CPC ............ B64C 23/072; B64C 3/56; B64C 3/42
See application file for complete search history.

(56) References Cited

U.S. PATENT DOCUMENTS

| | | | |
|---|---|---|---|
| 9,499,255 B2 * | 11/2016 | Chaussee | B64C 3/56 |
| 9,873,502 B2 | 1/2018 | Good et al. | |
| 9,908,612 B2 | 3/2018 | Fox | |
| 10,214,278 B2 * | 2/2019 | Briancourt | B64C 3/56 |
| 10,392,101 B2 * | 8/2019 | Axford | B64C 23/072 |
| 10,464,658 B2 * | 11/2019 | Harding | B64C 3/56 |
| 11,001,366 B2 * | 5/2021 | Bousfield | B64C 3/56 |
| 2017/0021911 A1 * | 1/2017 | Wildschek | B64C 3/42 |
| 2018/0099735 A1 | 4/2018 | Kelly et al. | |

FOREIGN PATENT DOCUMENTS

| | | |
|---|---|---|
| EP | 1531126 | 2/2007 |
| WO | 2017118832 | 7/2017 |

* cited by examiner

*Primary Examiner* — Richard R. Green
*Assistant Examiner* — Madison Elizabeth Dittner
(74) *Attorney, Agent, or Firm* — Norton Rose Fulbright Canada

(57) ABSTRACT

A wing having a main wing section with a forward spar and an aft spar extending through an internal cavity. The forward and aft spars are spaced apart and delimiting a dry segment of the internal cavity. A winglet is rotatably coupled to the main wing section by a cant hinge defining a cant axis about which the winglet rotates relative to the main wing section between an extended position in which the winglet is aligned with the main wing section, and a folded position in which the winglet is rotated about the cant axis. A linkage assembly disposed in the dry segment is pivotably mounted to one of the forward and aft spars and is coupled to the cant hinge. The linkage assembly is displaceable to apply a force to move the winglet between the extended position and the folded position during flight of the aircraft.

15 Claims, 5 Drawing Sheets

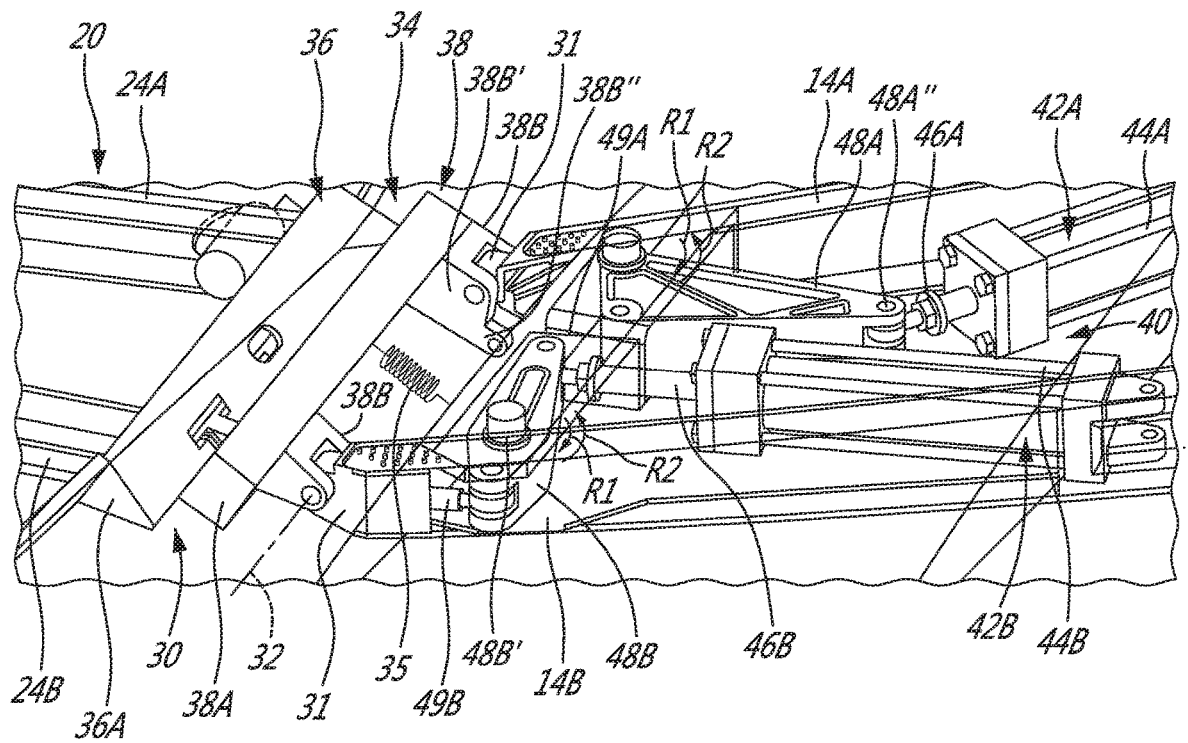
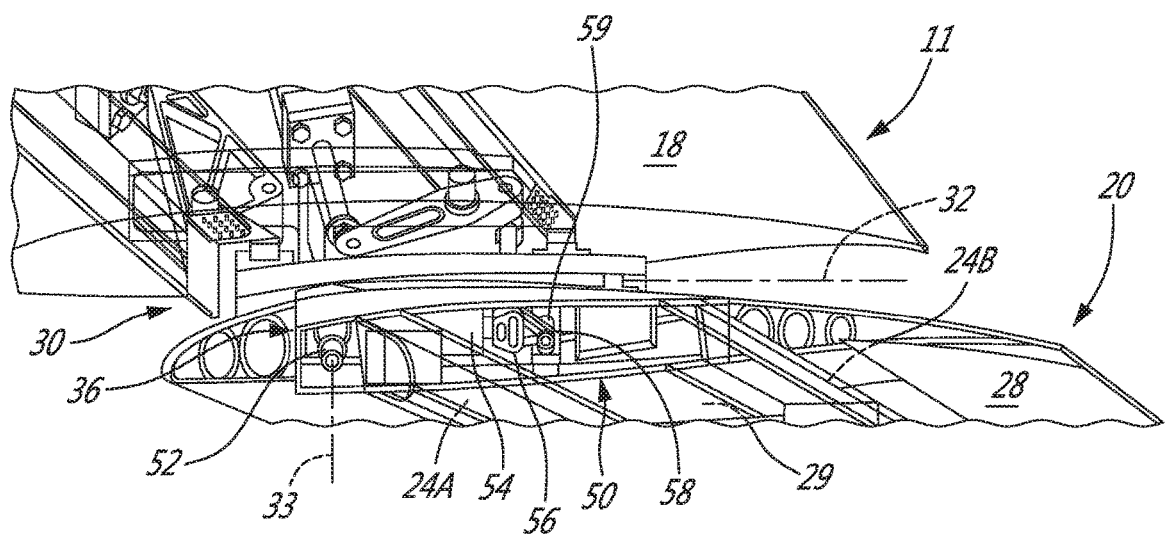

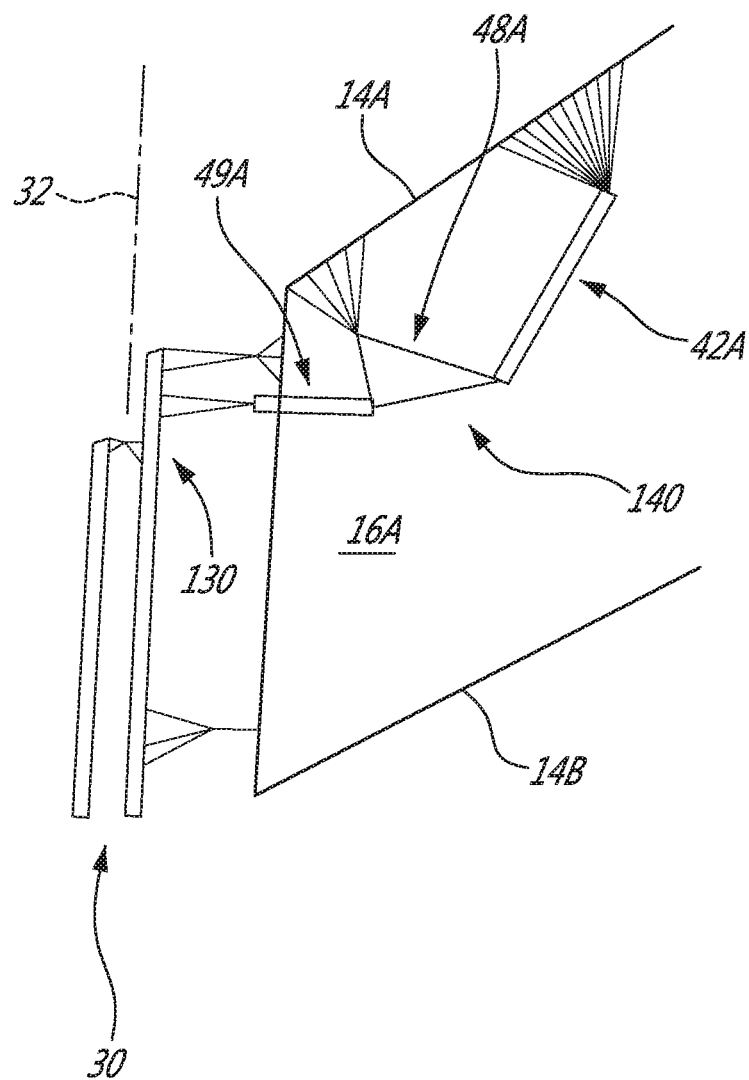

AIRCRAFT WING WITH DISPLACEABLE WINGLET

CROSS-REFERENCE TO RELATED APPLICATIONS

This application claims priority to U.S. Provisional Patent Application 62/809,795 filed Feb. 25, 2019, the entire contents of which are incorporated by reference herein.

TECHNICAL FIELD

The application relates generally to aircraft wings and, more particularly, to aircraft wings having winglets.

BACKGROUND

Aircraft are typically designed to have optimal aerodynamic characteristics at a single point in their flight envelope. For example, wing tip devices are typically used to improve aerodynamic performance at cruise and take-off. However, the altitude and the fuel loading change continuously throughout the flight, and the aircraft may often have to fly at non-optimal flight conditions. The aircraft may also operate at Mach numbers that can be significantly different from the ones used as the design condition. The resulting sub-optimal performance may affect the fuel efficiency of the aircraft.

SUMMARY

In one aspect, there is provided a wing for an aircraft, the wing comprising: a main wing section extending between a root portion and a distal portion, the main wing section having a forward spar and an aft spar extending through an internal cavity of the main wing section along a span thereof, the forward and aft spars being spaced apart in a chordwise direction at the distal portion of the main wing section and delimiting a dry segment of the internal cavity; a winglet rotatably coupled to the main wing section by a cant hinge defining a cant axis about which the winglet rotates relative to the main wing section, the winglet being movable between an extended position in which the winglet is aligned with the main wing section, and a folded position in which the winglet is rotated about the cant axis; and a linkage assembly disposed in the dry segment of the internal cavity of the main wing section, the linkage assembly pivotably mounted to one of the forward and aft spars and coupled to the cant hinge, the linkage assembly being displaceable to apply a force to the cant hinge to move the winglet between the extended position and the folded position during flight of the aircraft.

In another aspect, there is provided a method of displacing a winglet rotatably coupled to a main wing section of a wing of an aircraft, the method comprising: during flight of the aircraft, driving a linkage assembly disposed within the main wing section in a dry segment thereof defined between a forward spar and an aft spar of the main wing section at a distal portion of the main wing section, the linkage assembly coupled to the winglet such that driving the linkage assembly rotates the winglet about a cant axis relative to the main wing section during flight of the aircraft between an extended position in which the winglet is aligned with the main wing section, and a folded position in which the winglet is rotated about the cant axis.

DESCRIPTION OF THE DRAWINGS

Reference is now made to the accompanying figures in which:

FIG. 2C is another perspective view of part of the linkage assembly of FIG. 2B;

FIG. 2D is another perspective view of part of the linkage assembly of FIG. 2B;

FIG. 4 is a schematic view of an interior of a wing showing a linkage assembly.

DETAILED DESCRIPTION

Figure 1A:
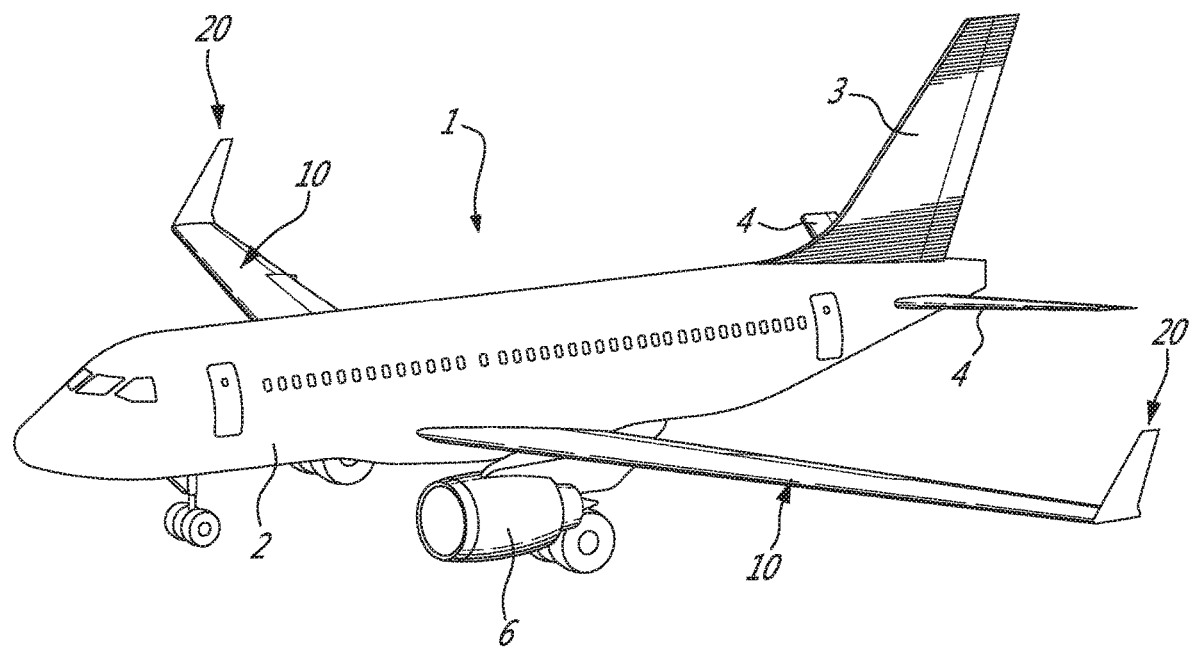
FIG. 1A is a perspective view of an aircraft.

Referring to the drawings and more particularly to FIG. 1A, an aircraft is shown at 1, and is generally described to illustrate some components for reference purposes in the present disclosure. The aircraft 1 has a fuselage 2 having a fore end and an aft end, with a cabin generally located between the cockpit and the tail assembly. A tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 10 project laterally from the fuselage 2. The aircraft 1 has engines 6 supported by the wings 10 in the depicted embodiment, although for other aircraft they can be mounted to the fuselage 2. The aircraft 1 is shown as a jet-engine aircraft, but may also be a propeller aircraft. It is also understood that the aircraft 1 can be a business aircraft, alternately it can be any other type of aircraft, manned or unmanned, including, but not limited to, a commercial aircraft or a military aircraft.

Figure 1B:
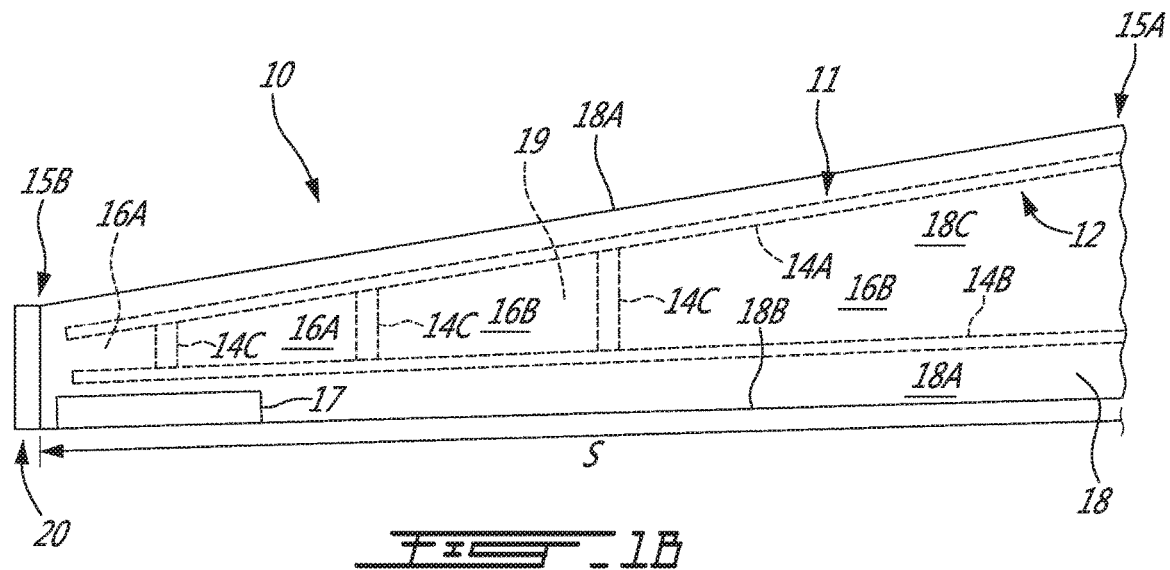
FIG. 1B is a top view of a wing of the aircraft of FIG. 1A, showing internal components of the wing.

FIG. 1B shows one of the wings 10 of the aircraft 1. The wing 10 has a main wing section 11 which forms the corpus of the wing 10 and provides structure thereto. The main wing section 11 makes up the bulk of the wing 10, and is responsible for almost all of the lift produced by the wing 10. The main wing section 11 has a span S, which forms part of the wing span of the aircraft 1 in the depicted embodiment. The span S is defined between a root portion 15A of the main wing section 11 and a tip or distal portion 15B of the main wing section 11. The root portion 15A is the portion of the wing 10 closest to the fuselage 2. The distal portion 15B is the portion of the main wing section 11 located furthest from the fuselage 2. In an embodiment, the distal portion 15B is defined between a 50% position and a 100% position along the span S of the main wing section 11. In an embodiment, the distal portion 15B is defined between a 80% position and a 100% position along the span S of the main wing section 11.

Still referring to FIG. 1B, the main wing section 11 has an internal frame 12. The internal frame 12 includes any suitable interconnection of components to provide structure to the main wing section 11 so that it can support the loads acting on the wing 10 during flight of the aircraft 1. In the depicted embodiment, the internal frame 12 includes any suitable arrangement of spars, ribs, stringers, and other members. As shown in FIG. 1B, the internal frame 12 includes a front or forward spar 14A and a rear or aft spar 14B, which are interconnected by multiple transverse ribs 14C.

The main wing section 11 also includes a skin 18 which covers the internal frame 12 and provides an aerodynamic outer surface 18A which in the depicted embodiment, helps the wing 10 to generate lift. A cross-section of the skin 18 taken in a plane transverse to the span S shows the profile of the airfoil defined by the main wing section 11 at that location along the span S. A leading edge portion 18A of the skin 18 covers the forward spar 14A, and a trailing edge portion 18B of the skin 18 covers the aft spar 14B. The wing 10 has a first or upper skin portion 18C defining an uppermost outer surface of the skin 18 and a second or lower skin portion 18D defining a lowermost outer surface of the skin 18 (see FIG. 2A). The skin 18 is any suitable metal or composite material, and is closed on itself such that it defines an internal cavity 19 of the wing 10 and a housing for the internal frame 12. The wing 10 may include multiple flight control surfaces (e.g. flaps, spoilers, ailerons, etc.). In FIG. 1B, the main wing section 11 includes an aileron 17 at the distal portion 15B of the main wing section 11, where the aileron 17 defines part of the trailing edge portion 18B of the main wing section 11.

As shown in FIG. 1B, the main wing section 11 "narrows" in a spanwise direction away from the root portion 15A. The chord of the main wing section 11, which is defined between the leading edge portion 18A and the trailing edge portion 18B at a spanwise location, decreases in a spanwise direction away from the root portion 15A. Stated differently, the chord along spanwise positions at the distal portion 15B is less than the chord along spanwise positions at the root portion 15A. The forward and aft spars 14A,14B are spaced apart in a chordwise direction along the span S of the main wing section 11.

Still referring to FIG. 1B, at the distal portion 15B of the main wing section 11, the forward and aft spars 14A,14B are spaced apart to define and delimit a dry segment 16A of the internal cavity 19 of the wing 10. The internal cavity 19 is divided into dry segments 16A and wet segments 16B. The dry segments 16A are volumes of the internal cavity 19 which include components that contribute to the functioning of the wing 10, such as wiring, linkages, piping, etc. In contrast to the dry segments 16A, the wet segments 16B are volumes of the internal cavity 19 in which fuel accumulates. The wet segments 16B are enclosed volumes which form fuel tanks, and are typically positioned on the main wing section 11 closer to the root portion 15A to avoid large moments acting on the wing 10.

The dry segment 16A of the internal cavity 19 at the distal portion 15B of the main wing section 11 is a volume that is delimited vertically by the upper and lower skin portions 18C,18D, and is delimited in the chordwise direction by the forward and aft spars 14A,14B. The dry segment 16A in the depicted embodiment is positioned between the 50% position and the 100% position along the span S of the main wing section 11. In an embodiment, the dry segment 16A is positioned between the 80% position and the 100% position along the span S of the main wing section 11. In FIG. 1B, the dry segment 16A delimited by the forward and aft spars 14A,14B is disposed between the leading edge portion 18A of the main wing section 11 and the aileron 17 at the distal portion 15B of the main wing section 11.

In FIG. 1B, the volume of the dry segment 16A at the distal portion 15B of the main wing section 11 is less than the volume of other dry and wet segments 16A,16B at positions along the span S that are closer to the root portion 15A. In FIG. 1B, the volume of the dry segment 16A at the distal portion 15B of the main wing section 11 is smaller than the volume of all other dry and wet segments 16A,16B of the main wing section 11. The dry segment 16A at the distal portion 15B of the main wing section 11 is the closest of all the dry and wet segments 16A,16B of the main wing section 11 to the tip of the wing 10. It will therefore be appreciated that the dry segment 16A of the internal cavity 19 at the distal portion 15B of the main wing section 11 is a relatively small and constrained internal volume of the main wing section 11.

FIGS. 1A and 1B also show a winglet 20 of the wing 10 that is moveably attached to the main wing section 11, which is now described in greater detail.

Figure 2A:
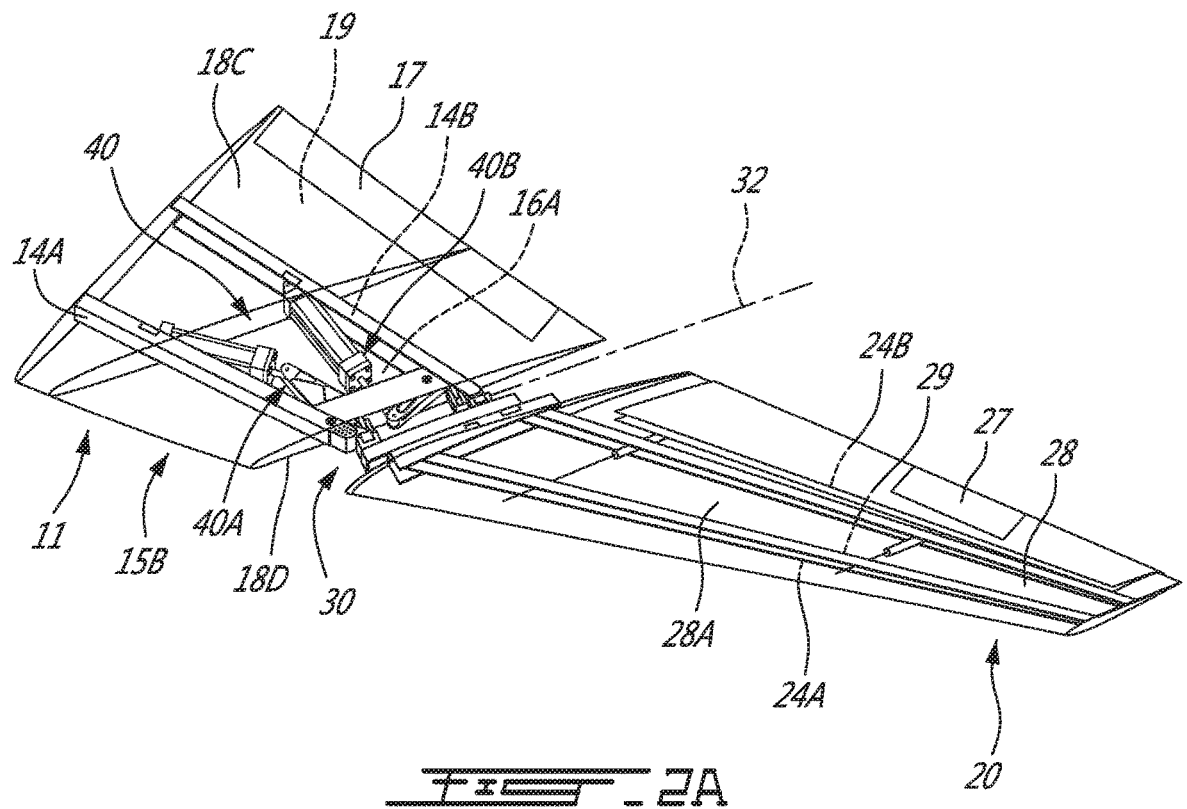
FIG. 2A is a perspective view of part of the wing of FIG. 1B, showing internal components of the wing.
Figure 3A:
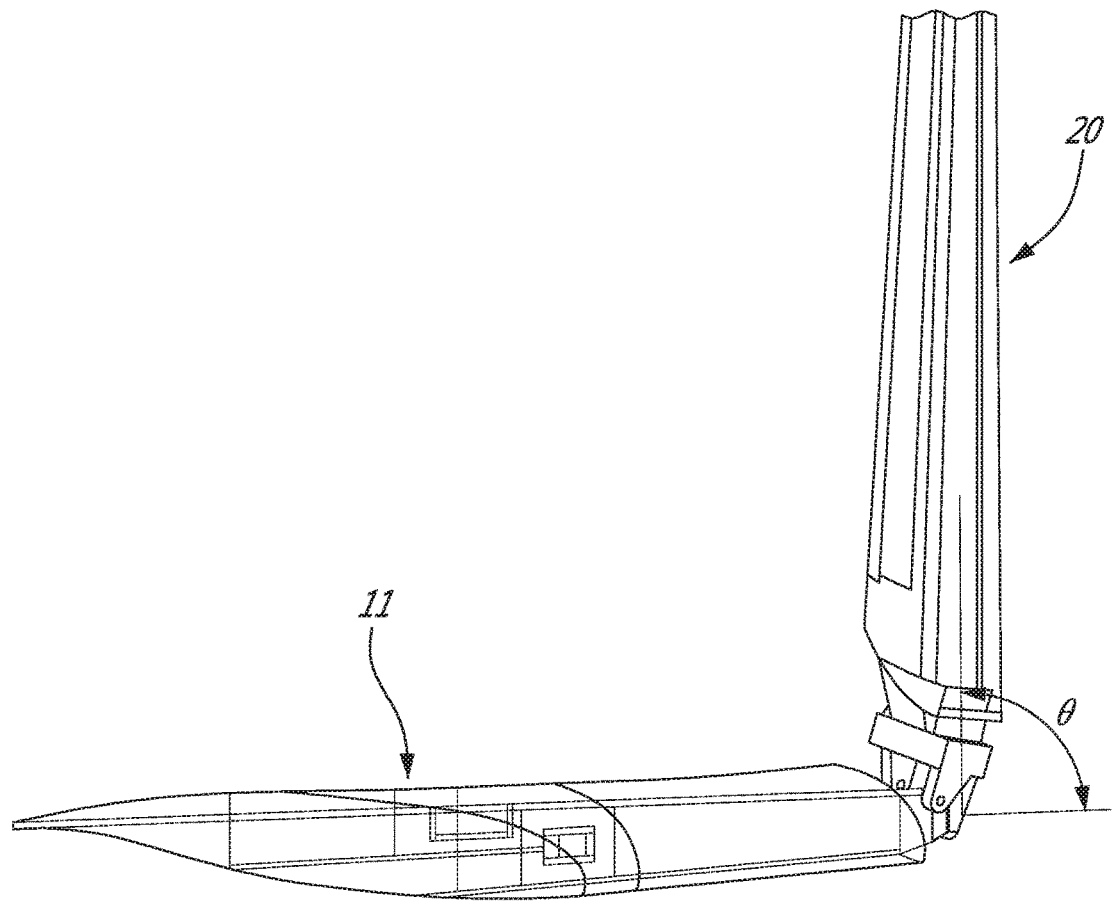
FIG. 3A is a perspective view of part of the wing of FIG. 1B and a winglet of the wing, the winglet being shown in a folded position.
Figure 3B:
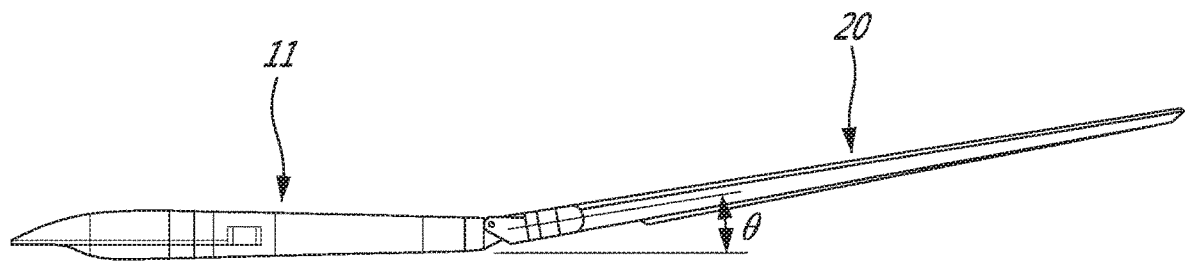
FIG. 3B is a perspective view of part of the wing of FIG. 1B and the winglet, the winglet being shown in an extended position.

Referring to FIG. 2A, the winglet 20 is an aerodynamic body which can function to, for example, compensate for the negative effects of wing-tip vortices, and/or smooth the airflow over the upper skin portion 18C near the tip of the wing 10. The winglet 20 is rotatably coupled to the main wing section 11 by a cant hinge 30 which defines a cant axis 32. The cant axis 32 extends in a chordwise direction. The winglet 20 may therefore be displaced relative to the main wing section 11. More particularly, the winglet 20 may be rotated relative to the main wing section 11 about the cant axis 32 between an extended position (see FIG. 3B) in which the winglet 20 is substantially aligned with the main wing section 11, and a folded position (see FIG. 3A) in which the winglet 20 is rotated about the cant axis 32. Referring to FIGS. 3A and 3B, a cant angle θ is defined between a plane defined by the winglet 20 and a plane defined by the main wing section 11. When the winglet 20 is in the extended position shown in FIG. 3B, the cant angle θ is relatively small, for example, between 0° and 10°. When the winglet 20 is in one of the possible folded positions, such as the one shown in FIG. 3A, the cant angle θ is different. In FIG. 3A, the cant angle θ is about 90°. The winglet 20 may be rotated about the cant axis 32 to any other desired folded position to form any desired cant angle θ with the main wing section 11. In an embodiment, the cant angle θ is between 10° and 80°.

Referring to FIG. 2A, the winglet 20 may take any suitable form and have any suitable components to achieve the functionality described above. In the embodiment shown in FIG. 2A, the winglet 20 includes a skin 28 enclosing an internal winglet cavity 29. The skin 28 provides an aerodynamic outer surface 28A of the winglet 20. Forward and aft winglet spars 24A,24B extend in a spanwise direction through the winglet cavity 29. The illustrated winglet 20 may have flight control surfaces, such as one or more winglet ailerons 27. The winglet 20 "narrows" in a spanwise direction away from its connection with the main wing section 11. The chord of the winglet 20 decreases in a spanwise direction away from the main wing section 11. The forward and aft winglet spars 24A,24B are spaced apart in a chordwise direction along the span of the winglet 20.

Figure 2B:
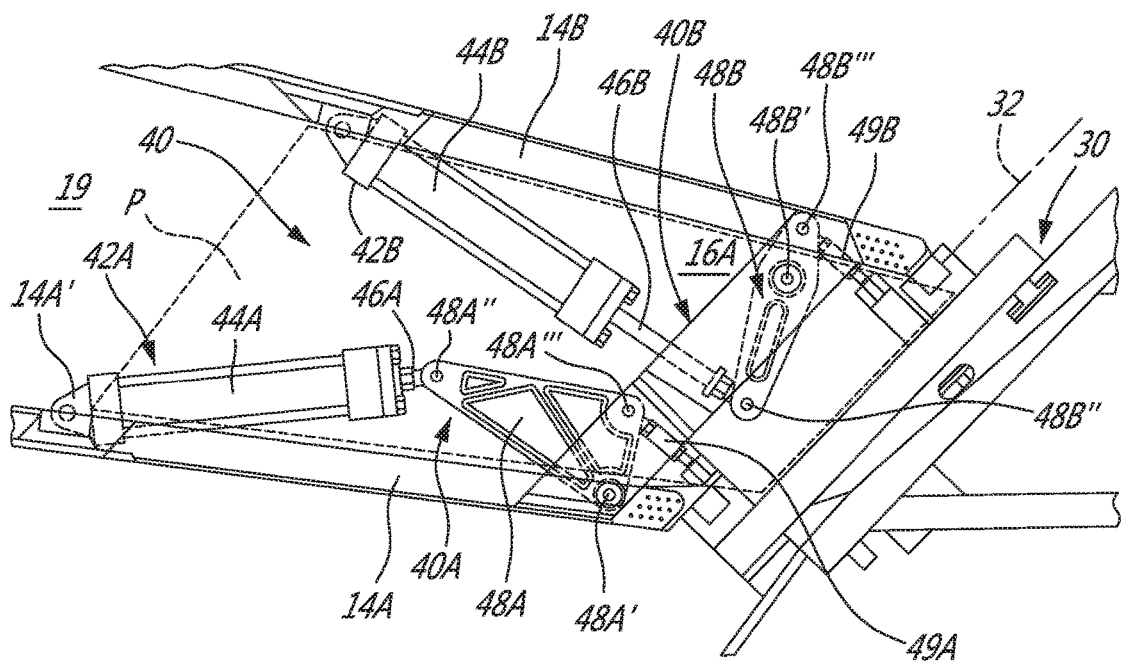
FIG. 2B is a perspective view of a linkage assembly of the wing of FIG. 1B.

Referring to FIGS. 2A and 2B, the wing 10 also includes a linkage assembly 40. The linkage assembly 40 is a grouping of active and passive cooperating components which are all located within the constrained and relatively small volume of the dry segment 16A of the internal cavity 19 at the distal portion 15B of the main wing section 11. The cooperating components of the linkage assembly 40 operate to rotate or pivot a common component, which is the winglet 20, relative to the main wing section 11 about the cant axis 32. The linkage assembly 40 is pivotably mounted to both of the forward and aft spars 14A,14B, such that components of the linkage assembly 40 are pivotable about fixed pivot axes. In an alternate embodiment described below, the linkage assembly 40 is pivotably mounted to only one of the forward and aft spars 14A,14B. The linkage assembly 40 is also coupled to the cant hinge 30 such that displacement of components of the linkage assembly 40 result in a force being applied to the cant hinge 30 to move the winglet 20 between the extended and folded positions. As described in greater detail below, the components of the linkage assembly 40 displace relative to the forward and aft spars 14A,14B which remain immobile, or fixed in position.

The linkage assembly 40 functions to move the winglet 20 while the aircraft 1 is in flight, in addition to being able to move the winglet 20 while the aircraft 1 is stationary or on the ground. The linkage assembly 40 thus functions to adjust the cant angle θ of the winglet 20 at different stages of flight of the aircraft 1, such as during taxiing, ground operations, cruise, take-off, climb, and descent of the aircraft 1. The linkage assembly 40 is thus a mechanism for varying in flight the cant angle θ of the winglet 20, in a continuous manner if desired, between the substantially horizontal extended position to the upright folded position. Some conventional and stationary wingtip devices are designed and optimized only for the cruise flight stage in order to manage wing-induced drag, and are not displaceable during flight. The linkage assembly 40 and the winglet 20 disclosed herein allows the wing 10 to have a variable geometry throughout the flight envelope of the aircraft 1, which may allow for selecting the optimal geometry of the winglet 20 for a given flight stage, so as to minimize drag at different stages of flight of the aircraft 1. This may lead to improved fuel savings through reduced aircraft drag over entire flight envelope.

The linkage assembly 40 may therefore be disposed in the constrained space of the dry segment 16A between the aileron 17 of the main wing section 11 and the winglet 20. Indeed, most of the internal cavity 19 of the main wing section 11 is composed of wet segments 16B, and other dry segments 16A of the internal cavity 19 may be occupied with slats, flaps, ailerons and spoilers, or mechanisms actuating these control surfaces. There is thus a limited amount of space available for the linkage assembly 40 in the dry segment 16A at the tip of the main wing section 11. The positioning of the linkage assembly 40 within the constrained and relatively small volume of the dry segment 16A helps to displace the winglet 20 during flight when it may experience significant aerodynamic loading. The linkage assembly 40 also contributes to limiting the weight penalty and moment arm because it is housed within the wing 10, and thus prevents significant mass from being added to the winglet 20, which may minimize dynamic effects. It is understood that the winglet 20 produces a lifting force during flight at a distance from the location of the cant axis 32, which creates a moment arm that may cause a significant amount of loading on the linkage assembly 40. The mounting of the linkage assembly 40 to one or both of the forward and aft spars 14A,14B may provide a direct load path into the front and aft spars 14A,14B to compensate for such loading.

The linkage assembly 40 may take any suitable form and have any suitable components to achieve the functionality described above. Referring to FIG. 2B, the linkage assembly 40 in the depicted embodiment includes a first linkage assembly 40A pivotably mounted to the forward spar 14A, and a second linkage assembly 40B also disposed in the dry segment 16A and pivotably mounted to the aft spar 14B. The first and second linkage assemblies 40A,40B are both coupled to the cant hinge 30 to apply the force to the cant hinge 30 to move the winglet 20 between the extended position and the folded position during flight of the aircraft 1. The movement of the first and second linkage assemblies 40A,40B is coordinated, and may be simultaneous, to effect movement of the winglet 20. The first and second linkage assemblies 40A,40B lie in a common plane P extending between the forward and aft spars 14A,14B. The plane P in the depicted embodiment is parallel to the span S of the main wing section 11. The plane P in the depicted embodiment has a substantially horizontal orientation. Some or all of the components of the first and second linkage assemblies 40A,40B are displaceable in the plane P. The linkage assembly 40 in FIG. 2B is thus composed of two similar forward and aft assemblies 40A,40B, laid out in parallel, that connect the winglet 20 to the forward and aft spars 14A,14B.

The first linkage assembly 40A includes a first linear actuator 42A having a first actuator housing 44A pivotably mounted to the forward spar 14A, and a first piston rod 46A displaceable relative to the first actuator housing 44A. The first piston rod 46A extends outwardly from the first actuator housing 44A, and is retractable to be housed within the first actuator housing 44A. The first linkage assembly 40A also includes a first crank 48A pivotably mounted to the forward spar 14A, and pivotably coupled to the first piston rod 46A to be displaced thereby. The first crank 48A can be any link or structural member to support the loads acting on the first linkage assembly 40A, and to transfer motion. The first crank 46A may thus be any suitable rod, shaft, toggle, tie rod, etc. capable of such functionality. The first linkage assembly 40A also has a first tie rod or toggle 49A having a first end pivotably coupled to the first crank 48A and a second end pivotably coupled to the cant hinge 30. The first linear actuator 42A helps to counteract aerodynamic loads from the winglet 20 through the first toggle 49A, which helps to provide tensile/compressive loading acting at an effective moment arm about the cant axis 32. The first toggle 49A drives a lever (defined by the first crank 48A) on the inboard side of the cant hinge 30, to help provide mechanical advantage to reduce loads on the first linear actuator 42A.

Still referring to FIG. 2B, the first actuator housing 44A is pivotably mounted to a pivot bracket 14A' of the forward spar 14A. The pivot bracket 14A' defines a pivot axis about which the first linear actuator 42A rotates, where the pivot axis is fixed in position. The pivot axis of the pivotable mounting of the first crank 48A to the forward spar 14A is also fixed in position, and is spaced apart in a spanwise direction from the pivot axis of the pivot bracket 14A'.

The second linkage assembly 40B includes a second linear actuator 42B having a second actuator housing 44B pivotably mounted to the aft spar 14B, and a second piston rod 46B displaceable relative to the second actuator housing 44B. The second linkage assembly 40B also includes a second crank 48B pivotably mounted to the aft spar 14B, and pivotably coupled to the second piston rod 46B to be displaced thereby. The second linkage assembly 40B also has a second tie rod or toggle 49B having a first end pivotably coupled to the second crank 48B and a second end pivotably coupled to the cant hinge 30. The first and second linear actuators 42A,42B thus fit between the forward and aft spars 14A,14B of the main wing section 11. The description of the components, mounting, and function of the first linkage assembly 40A applies mutatis mutandis to the components, mounting, and function of the second linkage assembly 40B.

Still referring to FIG. 2B, the first and second cranks 48A,48B have different shapes. The first crank 48A has a triangular shape, and has first, second, and third portions 48A',48A'',48A''' through which the first crank 48A is mounted to other components. For example, the first portion 48A' pivotably couples the first crank 48A to the forward spar 14A. The second portion 48A" pivotably couples the first crank 48A to the first piston rod 46A of the first linear actuator 42A. The third portion 48A''' pivotably couples the first crank 48A to the first toggle 49A. The second crank 48B has a linear, elongated shape, and has spar, piston, and third portions 48B',48B",48B''' through which the second crank 48B is mounted to other components. For example, the spar portion 48B' pivotably couples the second crank 48B to the aft spar 14B. The piston portion 48B" pivotably couples the second crank 48B to the second piston rod 46B of the second linear actuator 42B. The second toggle 49B is pivotably coupled to the second crank 48B via the third portion 48B". In an alternate embodiment, one or both of the first and second cranks 48A,48B is pivotably mounted to a rib 14C of the main wing section 11.

The first and second linear actuators 42A,42B, the first and second cranks 48A,48B, and the first and second toggles 49A,49B are displaceable in the common plane P extending between the forward and aft spars 14A,14B. In FIGS. 2A and 2B, the number of actuators (e.g. two) is greater than the degrees of freedom of the winglet 20, which has only one degree of freedom being its rotation about the cant axis 32. The depicted linkage assembly 40 may therefore be considered to be "actuation-redundant", which facilitates the implementation of an actuation system within the narrow space of the dry segment 16A of the internal volume 19 of the distal portion 15B of the main wing section 11, while still providing sufficient load-carrying capability to overcome the aerodynamics forces acting on the winglet 20 during flight. The first and second linear actuators 42A,42B are hydraulic actuators in the depicted embodiment, but other types of actuators are possible.

Referring to FIG. 2C, the cant hinge 30 includes a motion translation linkage 34 that is rotatable about the cant axis 32. The motion translation linkage 34 is an assembly of components which receive a linear force input from the linkage assembly 40 and translate it into a rotational movement of the winglet 20 about the cant axis 32. The motion translation linkage 34 has a winglet portion 36 coupled to the winglet 20, such as to the forward and aft winglet spars 24A,24B. The motion translation linkage 34 also has a wing portion 38 coupled to the second ends of the first and second toggles 49A,49B. In the depicted embodiment, the winglet portion 36 is fixedly coupled to the forward and aft winglet spars 24A,24B, such that there is no relative movement between the winglet portion 36 and the winglet 20. In FIG. 2C, the winglet portion 36 includes a winglet linkage 36A extending in a chordwise direction and being mounted to a wing linkage 38A of the wing portion 38 that also extends in a chordwise direction. The winglet and wing linkages 36A,38A are fixedly mounted to one another, and do not experience relative movement with respect to one another. The wing linkage 38A has force brackets 38B which are mounted to fixed hinge members 31 fixedly attached to the forward and aft spars 14A,14B at distal, terminal ends thereof. Each force bracket 38B has a first portion 38B' mounted about a pin of a corresponding fixed hinge member 31, and a second portion 38B" coupled to the second end of one of the first and second toggles 49A,49B. Each force bracket 38B is rotatable about the cant axis 32.

Still referring to FIG. 2C, the cant hinge 30 includes a biasing member 35. The biasing member 35 operates to bias the cant hinge 30 to bring the winglet 20 back to the extended position, and thus helps to alleviate some of the loading acting on the winglet 20 during flight. Although shown in FIG. 2C as a linear spring, the biasing member 35 may be or include a torsional spring.

Still referring to FIG. 2C, to move the winglet 20 from the extended position to the folded position, or to move the winglet 20 to a more upright folded position, the first piston rod 46A of the first linear actuator 42A extends away from the first actuator housing 44A. This exerts a force against the second portion 48A" of the first crank 48A, and causes the first crank 48A to rotate in the direction R1. The rotation of the first crank 48A in direction R1 in turn pushes on the first toggle 49A via the third portion 48A''', which in turn pushes the second portion 38B" of the force bracket 38B outwardly (away from the root portion 15A of the main wing section 11). While this movement of the first linkage assembly 40A is occurring, the second piston rod 46B of the second linear actuator 42B retracts toward the second actuator housing 44B. This causes the second crank 48B to also rotate in the direction R1, which in turn pushes the second toggle 49B via the third portion 48B''', which pushes the second portion 38B" of the corresponding force bracket 38B outwardly (away from the root portion 15A of the main wing section 11). The outward movement of the second portions 38B" of the force brackets 38B causes the rotation of the force brackets 38B about the cant axis 32, which in turn drives the winglet and wing linkages 36A,38A in an upward direction, thereby rotating the winglet 20 in the upward direction.

To move the winglet 20 from any folded position to the extended position, an opposite movement occurs. More particularly, the first piston rod 46A of the first linear actuator 42A retracts into the first actuator housing 44A. This draws on the second portion 48A" of the first crank 48A, and causes the first crank 48A to rotate in the direction R2 opposite to direction R1. The rotation of the first crank 48A in the direction R2 draws on the first toggle 49A via the third portion 48A''', and also draws the second portion 38B" of the force bracket 38B inwardly (toward the root portion 15A of the main wing section 11). While this movement of the first linkage assembly 40A is occurring, the second piston rod 46B of the second linear actuator 42B extends away from the second actuator housing 44B. This extension of the second piston rod 46B applies a force to the piston portion 48B" of the second crank 48B, and causes the second crank 48B to also rotate in the direction R2. The rotation of the second crank 48B in the direction R2 draws on the second toggle 49B via the third portion 48B''', and thus draws the second portion 38B" of the corresponding force bracket 38B inwardly (toward the root portion 15A of the main wing section 11). The inward movement of the second portions 38B" of the force brackets 38B causes the rotation of the force brackets 38B about the cant axis 32, which in turn drives the winglet and wing linkages 36A,38A in a downward direction, thereby rotating the winglet 20 in the downward direction. It can thus be appreciated that the first and second linkage assemblies 40A,40B, in cooperating with the cant hinge 30, convert a linear motion of the first and second linear actuators 42A,42B into a rotational movement of the winglet 20 about the cant axis 32.

As described above, the first and second piston rods 46A,46B are displaceable between a retracted position and an extended position. As the first piston rod 46A displaces from the retracted position to the extended position, the second piston rod 46B, simultaneously or shortly thereafter, displaces from the extended position to the retracted position. This movement of the first and second piston rods 46A,46B may be described as asymmetric. The space constraints in the dry segment 16A may not allow components of the first and second linkage assemblies 40A,40B to displace in the same manner. The motion of these components may therefore need to be coordinated so that as one of the linkage assemblies 40A,40B "extends", the other will "retract", to avoid a collision of components of the first and second linkage assemblies 40A,40B. This coordinated and asymmetric movement of the linkage assemblies 40A,40B may help to house them within the constrained space of the dry segment 16A, particularly for wings 10 which are swept.

In an embodiment, only one of the first and second piston rods 46A,46B is displaceable to displace the first and second linkage assemblies 40A,40B. In FIG. 2C, only the first piston rod 46A is active, such that only the first linear actuator 42A generates a force to displace both the first and second linkage assemblies 40A,40B and rotate the winglet 20. In FIG. 2C, the second piston rod 46B of the second linear actuator 42B is thus a "follower" or "slave" to the "leader" or "master" first linear actuator 42A. In an embodiment, the cant angular position of the winglet 20 is the input used to compute the "master" actuator position, and the change in the angular position of the winglet 20 determines the velocity profile and end position of the "master" actuator. The "slave" actuator velocity profile follows as a function of the "master" velocity profile.

Referring to FIG. 2D, the cant hinge 30 defines a toe axis 33. The toe axis 33 extends in a spanwise direction, and the winglet 20 rotates about the toe axis 33 to adjust the toe angle of the winglet 20 relative to the main wing section 11. The toe axis 33 is transverse to the cant axis 32 which extends in a chordwise direction. In FIG. 2D, the toe axis 33 is defined by a toe angle mechanism 50. The toe angle mechanism 50 is mounted to, or part of, the winglet portion 36 of the motion translation linkage 34 of the cant hinge 30. The toe angle mechanism 50 is housed in the internal winglet cavity 29 of the winglet 20. The toe angle mechanism 50 includes a pivot mounting 52 which defines the toe axis 33, and which mounts the toe angle mechanism 50 to the winglet portion 36. The toe angle mechanism 50 has an actuator 54 with a piston head 56 which is mounted to a bracket 58 housed within a slot 59. The piston head 56 displaces to engage the bracket 58 and pivot the winglet 20 about the toe axis 33. In FIG. 2D, the toe axis 33 is located at 25% of the chord of the winglet 20. The toe angle mechanism 50 is operable to rotate the winglet 20 through a range of ±5°, and also between ±2.5° relative to the plane defined by the main wing section 11. Other configurations are possible to adjust the toe angle of the winglet 20.

In FIGS. 2C and 2D, the cant hinge 30 is shown exposed to view to facilitate the description of its components, but it will be appreciated that the cant hinge 30 may be covered with a skin defining a smooth aerodynamic surface. In an embodiment, the cant hinge 30 and the linkage assembly 40 are housed within a skin such that they do not protrude past the outer mean line (OML) of the skin 18 of the main wing section 11 and the skin 28 of the winglet 20. The skin covering the cant hinge 30 helps to maintain a smooth blended transition at the junction of the main wing section 11 and the winglet 20.

Referring to FIG. 4, another embodiment of the linkage assembly 140 is shown. The linkage assembly 140 is a grouping of active and passive cooperating components which are all located within the constrained and relatively small volume of the dry segment 16A of the internal cavity 19 at the distal portion 15B of the main wing section 11. The cooperating components of the linkage assembly 140 operate to rotate or pivot a common component, which is the winglet 20, relative to the main wing section 11 about the cant axis 32. The linkage assembly 140 in FIG. 4 is pivotably mounted to only the forward spar 14A. The linkage assembly 140 is also coupled to the cant hinge 30 such that displacement of components of the linkage assembly 140 result in a force being applied to the cant hinge 130 to move the winglet 20 between the extended and folded positions. The components of the linkage assembly 140 are similar to those described above with respect to the first linkage assembly 40A, and the description of the first linkage assembly 40A and its components applies mutatis mutandis to the linkage assembly 140.

Referring to FIGS. 2A and 2B, there is also disclosed a method of displacing the winglet 20. During flight of the aircraft, the linkage assembly 40 disposed within the dry segment 16A is driven to rotate the winglet 20 about the cant axis 32 relative to the main wing section 11 during flight of the aircraft 1 between the extended position and the folded position.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A wing for an aircraft, the wing comprising:
a main wing section extending between a root portion and a distal portion, the main wing section having a forward spar and an aft spar extending through an internal cavity of the main wing section along a span thereof, the forward and aft spars being spaced apart in a chordwise direction at the distal portion of the main wing section and delimiting a dry segment of the internal cavity;
a winglet rotatably coupled to the main wing section by a cant hinge defining a cant axis about which the winglet rotates relative to the main wing section, the winglet being movable between an extended position in which the winglet is aligned with the main wing section, and a folded position in which the winglet is rotated about the cant axis; and
a linkage assembly disposed in the dry segment of the internal cavity of the main wing section, the linkage assembly pivotably mounted to one of the forward and aft spars and coupled to the cant hinge, the linkage assembly being displaceable to apply a force to the cant hinge to move the winglet between the extended position and the folded position during flight of the aircraft;
wherein the first linkage assembly is pivotably mounted to the forward spar, and the second linkage assembly is disposed in the dry segment and pivotably mounted to the aft spar and coupled to the cant hinge, the second linkage assembly being displaceable to apply the force to the cant hinge to move the winglet between the extended position and the folded position during flight of the aircraft the linkage assembly including a first linkage assembly and a second linkage assembly,
wherein the first linkage assembly includes:
a first linear actuator having a first actuator housing pivotably mounted to the forward spar, and a first piston rod displaceable relative to the first actuator housing;
a first crank pivotably mounted to the forward spar, and pivotably coupled to the first piston rod to be displaced thereby; and a first toggle having a first end pivotably coupled to the first crank and a second end pivotably coupled to the cant hinge; and wherein the second linkage assembly includes:

a second linear actuator having a second actuator housing mounted to the aft spar, and a second piston rod displaceable relative to the second actuator housing;

a second crank pivotably mounted to the aft spar, and pivotably coupled to the second piston rod to be displaced thereby; and a second toggle having a first end pivotably coupled to the second crank and a second end pivotably coupled to the cant hinge; and wherein the first and second linear actuators, the first and second cranks, and the first and second toggles are displaceable in a common plane extending between the forward and aft spars.

2. The wing of claim 1, wherein the first and second linkage assemblies lie in a common plane extending between the forward and aft spars.

3. The wing of claim 1, wherein the cant hinge includes a motion translation linkage rotatable about the cant axis, the motion translation linkage having a winglet portion coupled to the winglet and a wing portion coupled to the second ends of the first and second toggles.

4. The wing of claim 1, wherein the first and second piston rods are displaceable between a retracted position and an extended position, wherein as the first piston rod displaces from the retracted position to the extended position, the second piston rod displaces from the extended position to the retracted position.

5. The wing of claim 1, wherein only one of the first and second piston rods is displaceable to displace the first and second linkage assemblies.

6. The wing of claim 1, wherein the first and second cranks have different shapes.

7. The wing of claim 6, wherein:

the first crank has a first crank portion pivotably coupled to the forward spar, a second crank portion pivotably mounted to the first piston rod, and a third crank portion pivotably coupled to the first end of the first toggle; and the second crank has a piston crank portion pivotably coupled to the second piston rod, and a spar crank portion pivotably mounted to the aft spar, the first end of the second toggle being pivotably coupled to a third crank portion.

8. The wing of claim 1, wherein the cant hinge defines a toe axis about which the winglet rotates relative to the main wing section, the toe axis being transverse to the cant axis.

9. The wing of claim 1, wherein the main wing section has an aileron at the distal portion defining part of a trailing edge of the main wing section, the forward and aft spars disposed between the aileron and a leading edge of the main wing section.

10. The wing of claim 1, wherein the cant hinge comprises a biasing member.

11. The wing of claim 1, wherein a cant angle is defined between a plane containing the main wing section and a plane containing the winglet, the cant angle being between 0° and 90° above the plane containing the main wing section.

12. The wing of claim 1, wherein the first linkage assembly comprises:

a linear actuator having an actuator housing pivotably mounted to said forward or aft spar, and a piston rod displaceable relative to the actuator housing;

a first link pivotably mounted to said forward or aft spar, and pivotably coupled to the piston rod to be displaced thereby; and a second link having a first end pivotably coupled to the first link and a second end pivotably coupled to the cant hinge.

13. The wing of claim 12, wherein the linear actuator, the first link, and the second link are displaceable in a plane extending between the forward and aft spars.

14. The wing of claim 12, wherein the cant hinge comprises a motion translation linkage rotatable about the cant axis, the motion translation linkage having a winglet portion coupled to the winglet and a wing portion coupled to the second end of the second link.

15. A method of displacing a winglet rotatably coupled to a main wing section of a wing of an aircraft, the method comprising: during flight of the aircraft, driving a linkage assembly disposed within the main wing section in a dry segment thereof defined between a forward spar and an aft spar of the main wing section at a distal portion of the main wing section, the linkage assembly coupled to the winglet such that driving the linkage assembly rotates the winglet about a cant axis relative to the main wing section during flight of the aircraft between an extended position in which the winglet is aligned with the main wing section, and a folded position in which the winglet is rotated about the cant axis, wherein driving the linkage assembly includes displacing components of the linkage assembly in a common plane extending between the forward and aft spars, the components of the linkage assembly including: a linear actuator having an actuator housing pivotably mounted to one of the forward spar and the aft spar; a crank pivotably mounted to said one of the forward spar and the aft spar, and pivotably coupled to a piston rod of the linear actuator; and a toggle having a first end pivotably coupled to the crank and a second end pivotably coupled to the cant hinge.

* * * * *